(12) United States Patent (10) Patent No.: US 7,631,973 B2
Matsumiya et al. (45) Date of Patent: Dec. 15, 2009

(54) PROJECTOR

(75) Inventors: Toshio Matsumiya, Matsumoto (JP); Takeshi Utagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 554 days.

(21) Appl. No.: 11/500,643

(22) Filed: Aug. 8, 2006

(65) Prior Publication Data
US 2007/0046900 A1 Mar. 1, 2007

(30) Foreign Application Priority Data
Aug. 26, 2005 (JP) ............................... 2005-245130

(51) Int. Cl.
G03B 21/16 (2006.01)
G03B 21/18 (2006.01)
G03B 21/26 (2006.01)
G03B 21/14 (2006.01)
G03B 21/22 (2006.01)
(52) U.S. Cl. ............................... 353/57; 353/52; 353/60; 353/61; 353/119
(58) Field of Classification Search .................... 353/57, 353/119, 52, 60–61
See application file for complete search history.

(56) References Cited

U.S. PATENT DOCUMENTS

| 6,238,050 B1* | 5/2001 | Konuma et al. ............... 353/57 |
| 6,568,813 B1* | 5/2003 | Haba et al. ..................... 353/57 |
| 6,641,267 B2* | 11/2003 | Ohishi et al. ................... 353/61 |
| 6,793,343 B2* | 9/2004 | Nakano et al. ................. 353/61 |
| 6,880,938 B2* | 4/2005 | Nakano ....................... 353/119 |
| 7,481,540 B2* | 1/2009 | Morimoto et al. ............. 353/57 |
| 2003/0090634 A1* | 5/2003 | Tiao et al. ....................... 353/57 |
| 2003/0137640 A1* | 7/2003 | Nakano et al. ................. 353/57 |
| 2004/0080719 A1* | 4/2004 | Morinaga ..................... 353/61 |
| 2004/0095559 A1* | 5/2004 | Arai et al. ..................... 353/57 |
| 2004/0169825 A1* | 9/2004 | Ozawa et al. ................. 353/61 |
| 2004/0189954 A1* | 9/2004 | Kuroda ........................ 353/61 |
| 2004/0218151 A1* | 11/2004 | Ito et al. ....................... 353/57 |
| 2004/0246447 A1* | 12/2004 | Shiraishi ....................... 353/58 |
| 2005/0030484 A1* | 2/2005 | Kuroda .......................... 353/57 |
| 2005/0151933 A1* | 7/2005 | Tsai et al. ..................... 353/57 |

FOREIGN PATENT DOCUMENTS

JP 2003-215711 A 7/2003
JP 2007206604 A * 8/2007

* cited by examiner

*Primary Examiner*—Diane I Lee
*Assistant Examiner*—Jori S Byrne-Diakun
(74) *Attorney, Agent, or Firm*—AdvantEdge Law Group, LLC

(57) ABSTRACT

A projector includes an image projection device, an exterior chassis accommodating the substantially L-shaped image projection device, and a ventilation device configured to block leakage light and to insulate sound of the projector and to discharge air inside the exterior chassis to the outside through an air outlet formed on an end face located in a direction of projection. The image projection device includes a light source device, an optical modulation device, and a projection optical device. The ventilation device includes an axial fan with a suction port and a discharge port. An air outlet duct bends air discharged from the discharge port at an angle of substantially ninety degrees by a vertical wall substantially perpendicular to the discharging direction of air from the discharge port of the axial fan towards a side receding from the projection optical device to lead to the air outlet of the exterior chassis.

4 Claims, 11 Drawing Sheets

F I G. 7
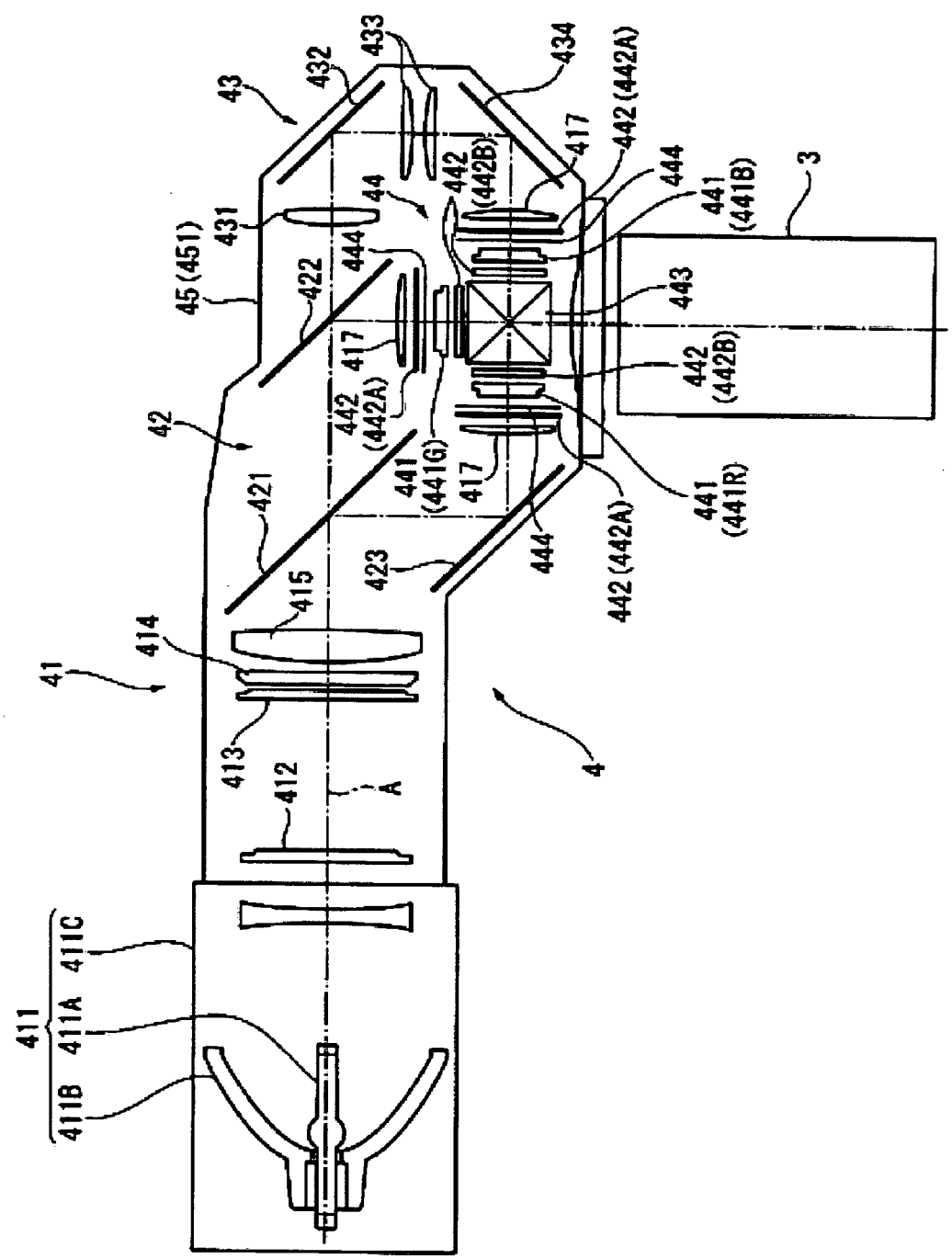

PROJECTOR

BACKGROUND

1. Technical Field

The present invention relates to a projector.

2. Related Art

In the past, a projector, which has formed an optical image by modulating a light beam emitted from a light source in accordance with image information and projected the optical image as an enlarged image, has been known (see for example, JP-A-2003-215711).

The projector is provided with a ventilation duct unit (a ventilation device) for discharging hot air heated by the light source device operating in a high temperature to the outside of the projector for enhancing cooling efficiency of the light source device.

The ventilation device is provided with an axial fan disposed adjacent to the light source device and for drawing and discharging the air around the light source device and a ventilation duct for leading the air discharged by the axial fan to an air outlet provided to an exterior case (an exterior chassis), and is configured to form a substantially straight air flow channel from the axial fan to the air outlet. It should be noted here that the air outlet for discharging the air in the ventilation duct is provided with a louver composed of a plurality of louver boards each inclined at a predetermined angle to lead the exhaust stream in a direction deflected from a projection direction of a projection optical device. And, the louver prevents the light from leaking outside the projector via the air outlet, and at the same time, prevents fluctuation in a projected image caused by the exhaust stream.

However, since the ventilation device described in JP-A-2003-215711 is configured to have the substantially straight air flow channel from the axial fan to the air outlet, the sound generated from the axial fan while the axial fan is in operation is apt to leak outside the projector via the ventilation duct and the air outlet, thus making it difficult to assure silentness of the projector.

Further, it is necessary to provide the louver to the ventilation duct for blocking the leakage light (the light leaking via the air outlet) to the outside of the exterior chassis or preventing the fluctuation on the projected image caused by the exhaust stream, thus the shape of the ventilation duct is made more complicated, and manufacturing of the ventilation duct is apt to become difficult.

Therefore, a structure capable of assuring the silentness of the projector, blocking the leakage light to the outside of the exterior chassis without making the shape of the ventilation duct more complicated, and preventing the fluctuation on the projected image caused by the exhaust stream is demanded.

SUMMARY

An advantage of the invention is to provide a projector capable of assuring silentness, blocking the leakage light to the outside of the exterior chassis without making the shape of the ventilation duct more complicated, and preventing the fluctuation on the projected image caused by the exhaust stream.

A projector according to an aspect of the invention includes an image projection device including a light source device, a optical modulation device that modulates a light beam emitted from the light source device in accordance with image information, and an projection optical device that projects enlarged projection of the light beam modulated by the optical modulation device disposed in a substantially L-shape sequentially from one end to the other end, an exterior chassis accommodating the image projection device, and provided with an air outlet for discharging inside air to the outside formed on an end face on the side of direction of projection, and a ventilation device that discharges air inside the exterior chassis to the outside and includes an axial fan provided with a suction port for sucking air and a discharge port for discharging the sucked air, and disposed in an area inside the exterior chassis and surrounded by the substantially L-shape of the image projection device and adjacent to the light source device so that a discharging direction of air from the discharge port is set towards the projection optical device, and the suction port and the discharge port are set at a predetermined angle with a plane perpendicular to the direction of projection of the projection optical device, and an air outlet duct that is provided with a vertical wall substantially perpendicular to the discharging direction of the air from the discharge port of the axial fan, and bends the air discharged from the discharge port by the vertical wall at an angle of substantially ninety degrees towards a side receding from the projection optical device to lead to the air outlet of the exterior chassis.

In this aspect of the invention, the ventilation device includes the axial fan and the air outlet duct, and the air outlet duct has the vertical wall substantially perpendicular to the discharging direction of the air from the discharge port of the axial fan. Therefore, the sound generated by the axial fan when the axial fan is driven and proceeding by conducted inside the air outlet duct can be insulated by the vertical wall. Therefore, the sound from the axial fan conducted inside the air outlet duct can be prevented from leaking outside the projector via the air outlet, thus the silentness of the projector can be assured. Further, since the vertical wall is substantially perpendicular to the discharging direction, if the sound from the axial fan is reflected by the vertical wall, the sound is prevented from proceeding towards the air outlet, thus the sound from the axial fan can effectively be insulated.

Further, in the air outlet duct, if leakage light inside the exterior chassis enters inside via the inlet for leading air inside, the leakage light can be blocked by the vertical wall. Therefore, it can be prevented that the leakage light is conducted inside the air outlet duct and leaks outside the projector via the air outlet, thus it is prevented to cause uncomfortable feeling to those appreciating the image projected by the projector. Further, since the vertical wall is substantially perpendicular to the discharging direction, if the leakage light is reflected by the vertical wall, it can be prevented from proceeding towards the air outlet, thus the leakage light can effectively be blocked.

Further, since in the ventilation device, the axial fan is disposed at a predetermined angle with the projection direction as described above, and the air outlet duct is configured to lead the air discharged from the discharge port of the axial fan to the air outlet after turning it by the vertical wall at an angle substantially 90 degrees to the side receding from the projection optical device, it can prevented that the exhaust stream interferes with the projection direction of the projection optical device, thus the generation of fluctuation on the projected image can be prevented.

As described above, by arranging the disposition of the axial fan and the shape of the air outlet duct to form a substantially L-shaped air flow path from the axial fan to the air outlet bending at an angle substantially 90 degrees, a structure capable of blocking the leakage light to the outside of the exterior chassis with the air outlet duct having a simple shape and a simple structure, and preventing fluctuation on the projected image from being caused by the exhaust stream can be realized without adopting the conventional structure in which the exhaust duct is provided with a louver for bending the exhaust stream. Further, by adopting such a structure, a plurality of louver boards extending in a direction traversing the air flow direction inside the exhaust duct for bending the exhaust stream towards a direction of receding from the projection direction of the projection optical device can be eliminated. Since the air inside the exterior chassis can effectively be discharged by the ventilation device without degrading the air discharging efficiency by the plurality of louver boards, enhancement of cooling efficiency of the light source device can be achieved. Further, the axial fan can be disposed at a position nearer to the center of the projector, thus the noise caused by the fan can be prevented from being conducted to the outside.

A projector according to another aspect of the invention further includes a power supply device that supplies each of composing members of the projector with electricity, wherein, the power supply device extends along the direction of projection of the projection optical device and is disposed at a side of the image projection device so that the power supply device and the light source device form a substantially L-shape, the axial fan is preferably disposed so as to form a substantially triangle space in a plan view in conjunction with the light source device, and the power supply device.

According to this aspect of the invention, since the axial fan is disposed so as to form the substantially triangle space in the plan view in conjunction with the light source device and the power supply device, the air adjacent to the light source device heated by the light source device and the air adjacent to the power supply device heated by the power supply device can be sucked in a lump, thus the both of the light source device and the power supply device can efficiently be cooled.

In the projector according to another aspect of the invention, the exterior chassis is formed including an upper case forming a top face in the projector, a lower case forming a bottom face in the projector, and a front case forming a front face located in the direction of projection of the projection optical device in the projector, the front case is provided with the air outlet, and a tubular section is preferably provided integrally with a periphery section of the air outlet and protrudes inward the exterior chassis at substantially the same angle as the predetermined angle of the axial fan with the plane perpendicular to the direction of projection of the projection optical device, so as to be connectable to the air outlet duct.

According to this aspect of the invention, since the tubular section is provided to the front case, the air outlet and the air outlet duct can be connected with the tubular section, thus the air discharged from the axial fan can be allowed to flow through the air flow path going through the air outlet duct, the tubular section, and the air outlet, and can effectively be discharged outside the projector through the air outlet without increasing the air outlet duct in size.

Further, since the front case is configured separately from the upper case and the lower case, by forming the front case using an injection molding process from synthetic resin, for example, the tubular section can easily be molded integrally with the exterior chassis (front case).

In the projector according to another aspect of the invention, the air outlet duct is formed including a substantially cuboid hollow member, an inlet for leading air inside is formed on one side end face of the substantially cuboid member, and an outlet for discharging inside air to the outside is formed on a side end face intersecting with the one side end face, the one side end face has a substantially square shape in a plan view, and the air outlet duct is preferably arranged to have a distance between the one side end face and the vertical wall, which is the side end face opposing the one side end face, greater than a half a vertical size or a horizontal size of the substantially square shape in a plan view of the one side end face.

According to this aspect of the invention, since the air outlet duct is composed of the substantially cuboid hollow member, by forming the inlet in one side end face of the substantially cuboid member and forming the outlet in the side end face intersecting with the one end face, the air discharged from the axial fan and led inside via the inlet can be discharged via the outlet after bending by the vertical wall, which is the side end face opposing the one side end face at an angle of substantially 90 degrees. Therefore, the air outlet duct becomes a simple shape, thus the air outlet duct can easily be manufactured.

It should be noted here that, considering the air discharging efficiency in the ventilation device, the opening area of the inlet and the opening area of the outlet are preferably set substantially equal to the area of the one side end face and the area of the side end face intersecting with the one side end face.

Incidentally, if the air outlet duct is configured as follows, it is difficult to enhance the cooling efficiency of the light source device.

Namely, it is arranged that the one side end face to which the inlet is formed is a square in the plan view. Further, as described above, the inlet and the outlet are formed in the entire area of the respective one of the side end faces. And, the distance between the one side end face to which the inlet is formed and the side end face opposing the one side end face is set smaller than a half the vertical size or the horizontal size of the square shape in the plan view in the one side end face.

When it is configured as above, the opening area of the outlet becomes smaller than a half the opening area of the inlet. The air discharging efficiency in the ventilation device lowered, and it is difficult to achieve enhancement of cooling efficiency of the light source device.

In the above aspect of the invention, since in the air outlet duct, the distance between the one side end face in which the inlet is formed and the vertical wall which is the side end face opposing to the one side end face is set greater than a half the vertical length or the horizontal length of the square shape in the plan view in the one side end face, the opening area of the outlet can be set greater than a half the opening area of the inlet, thus the air inside the exterior chassis can effectively be discharged to the outside by the ventilation device without reducing the air discharging efficiency of the ventilation device, thus the enhancement of cooling efficiency of the light source device can be achieved.

BRIEF DESCRIPTION OF THE DRAWINGS

The invention will now be described with reference to the accompanying drawings, wherein like numbers refer to like elements.

FIG. 7 is a plan view schematically showing an optical system of an optical unit according to the embodiment.

DESCRIPTION OF EXEMPLARY EMBODIMENTS

An embodiment of the invention will hereinafter be explained with reference to the accompanying drawings.

1. External Configuration

Figure 1:
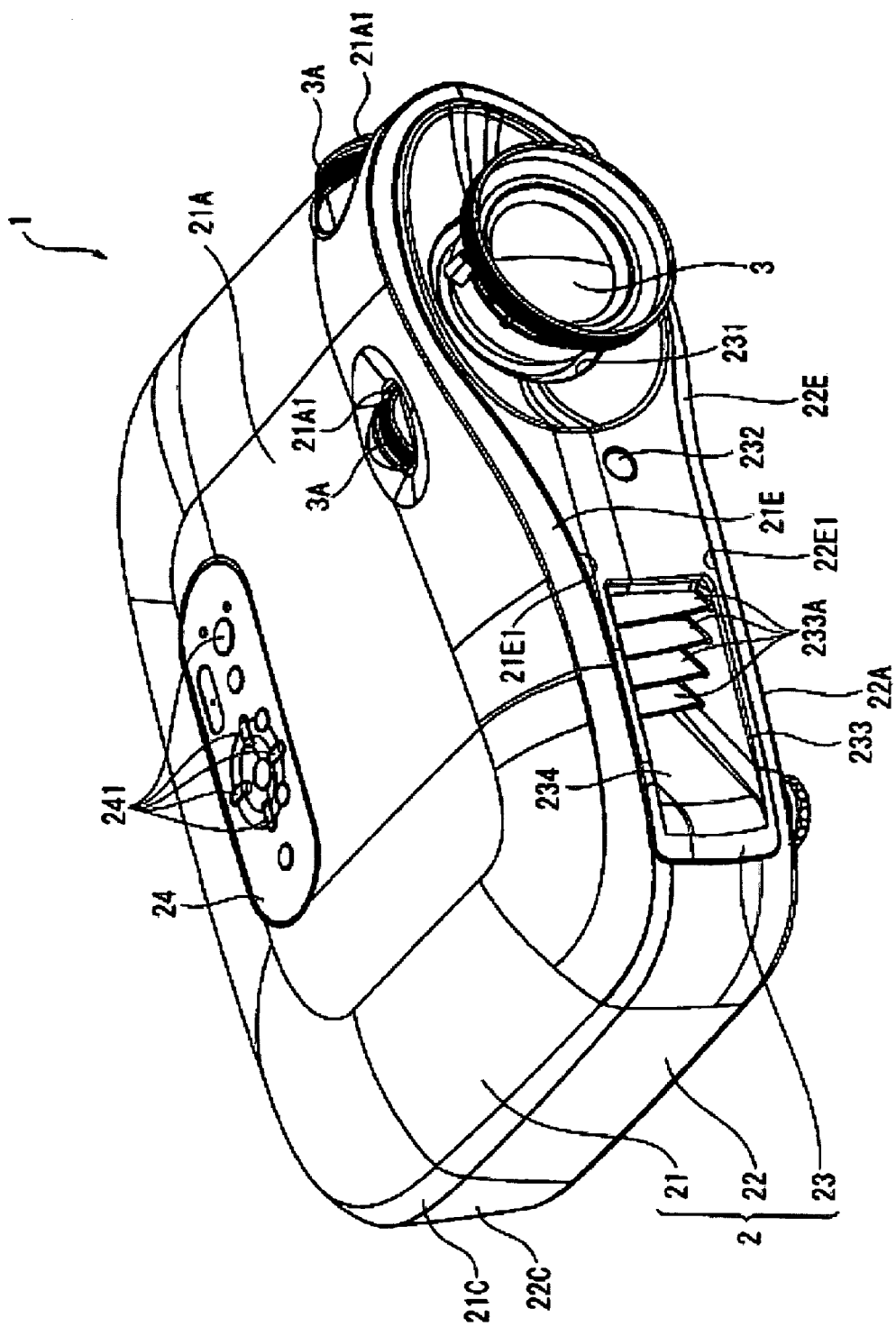
FIG. 1 is a perspective view showing an external appearance of a projector according to the present embodiment.
Figure 2:
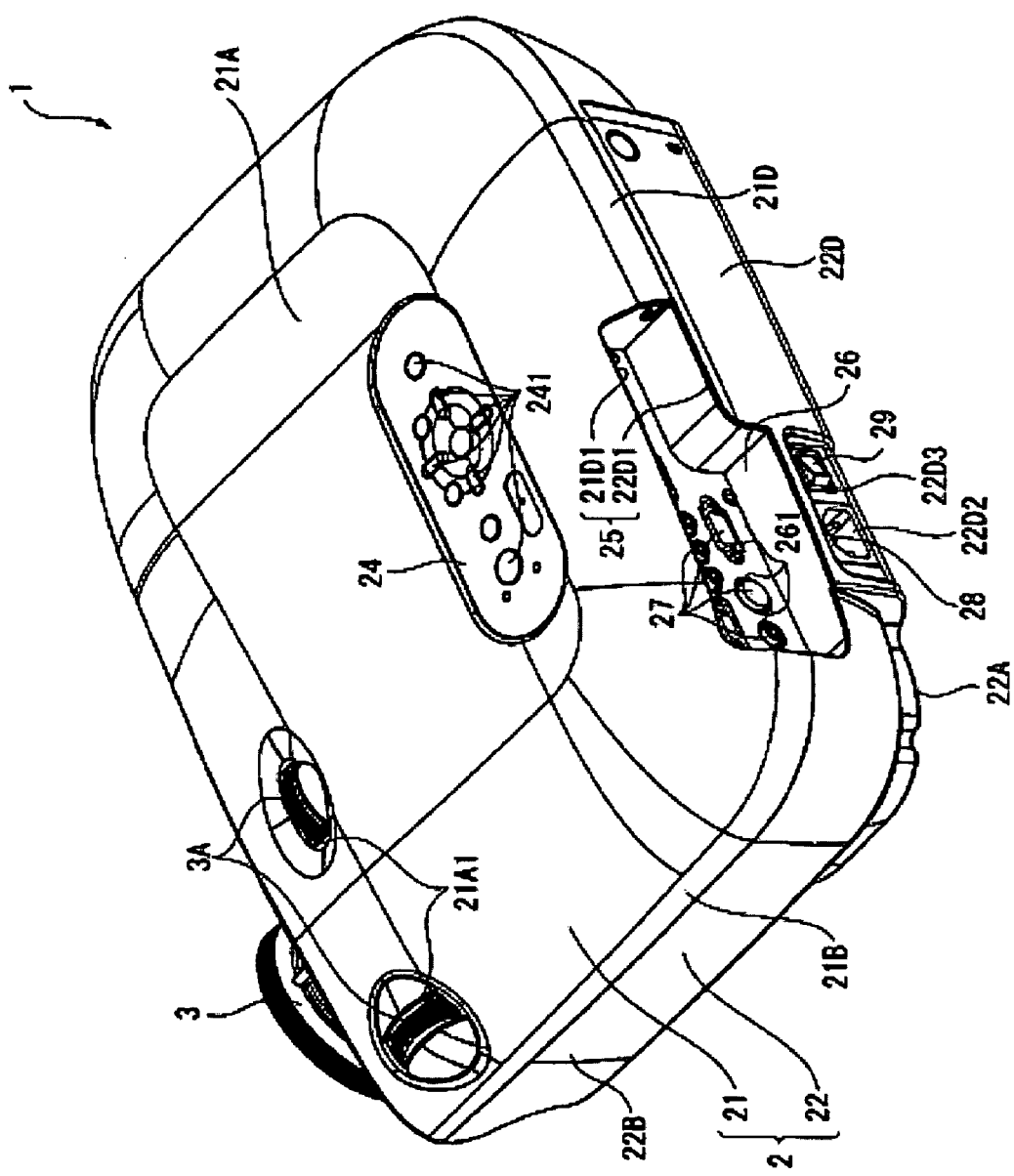
FIG. 2 is a perspective view showing an external appearance of the projector according to the embodiment.

FIGS. 1 and 2 are the perspective views showing the external appearance of a projector 1. Specifically, FIG. 1 is the perspective view showing the projector 1 viewed from an upper front side thereof. FIG. 2 is the perspective view of the projector 1 viewed from an upper rear side thereof.

The projector 1 is for forming an optical image by modulating an optical beam emitted from the light source in accordance with image information, and projecting the formed optical image on a screen (not shown) as an enlarged image. As shown in FIG. 1 or 2, the projector 1 is provided with a substantially cuboid shaped exterior chassis 2, and a projection lens 3 as the projection optical device exposed from the exterior chassis 2.

The projection lens 3 is configured as a set of lenses composed of a plurality of lenses housed in a cylindrical body tube, and projects enlarged projection of the image light modulated by a main body of the projector 1 in accordance with the image information.

The exterior chassis 2 is a molding made of synthetic resin, and houses the main body of the projector 1. As shown in FIG. 1 or 2, the exterior chassis 2 is provided with an upper case 21 covering the upper part of the main body of the device, a lower case 22 covering the lower part of the main body of the device, and a front case 23 (shown in FIG. 1) covering the front face of the main body of the device.

The upper case 21 is, as shown in FIG. 1 or 2, composed of top face section 21A, side face sections 21B (shown in FIG. 2), 21C (shown in FIG. 1), back face section 21D (shown in FIG. 2), and front face section 21E (shown in FIG. 1) forming top face, side face part, back face part, and front face part of the exterior chassis 2, respectively.

The top face section 21A has, as shown in FIG. 1 or 2, a substantially rectangular shape in the plan view, and smoothly curves from substantially the center section thereof to the front face side, side face sides, and the back face side forming a convex curve shape.

In a front right area of the top face section 21A viewed from the front side thereof, there are formed two opening sections 21A1, as shown in FIG. 1 or 2. And, the two opening sections 21A1 expose a part of various turn knobs 3A capable of operating the projection lenses 3 for performing projection position adjustment of a projection image projected on the screen (not shown).

Further, as shown in FIG. 1 or 2, in a rear side of the openings 21A1 of the top face section 21A, there is provided an operation panel 24 for performing start-up and adjustment operations of the projector 1 extending in a longitudinal direction. When operation buttons 241 of the operation panel 24 are properly pushed down, they contacts tactile switches mounted on a circuit board (not shown) disposed inner than the operation buttons 241, thereby making desired operations possible. Further, a light emitting diode (LED, not shown) is attached to the circuit board, and is arranged to emit light in accordance with a predetermined operation.

It should be noted that the circuit board of the operation panel 24 is electrically connected to a control board (not shown), and operation signals caused by pushing down the operation buttons 241 are output to the control board.

The side face sections 21B, 21C, the back face section 21D, and the front face section 21E are sections substantially hanging from respective edges of the rectangular shape in the plan view of the top face section 21A as shown in FIG. 1 or 2.

In the back face section 21D among these sections, in the left side area thereof viewed from the back face side, there is formed a notch 21D1 shaped like a bracket in the plan view from the lower edge towards the upper side as shown in FIG. 2.

Further, in the front face section 21E, as shown in FIG. 1, there is formed a notch 21E1 shaped like a bracket in the plan view from the lower edge towards the upper side.

The lower case 22 is, as shown in FIG. 1 or 2, composed of bottom face section 22A, side face sections 22B (shown in FIG. 2), 22C (shown in FIG. 1), back face section 22D (shown in FIG. 2), and front face section 22E (shown in FIG. 1) forming bottom face, side face part, back face part, and front face part of the exterior chassis 2, respectively.

The bottom face section 22A, although not shown specifically in the drawings, is composed of a substantially rectangular flat face. And, the bottom face section 22A is provided with a plurality of foot sections for grounding on a grounding face such as a desk, and an air intake for leading the cooling air in the projector 1 from the outside.

The side face sections 22B, 22C, the back face section 22D, and the front face section 22E are sections standing from respective edges of the rectangular shape in the plan view of the bottom face section 22A as shown in FIG. 1 or 2.

In the back face section 22D among these sections, in the left side area thereof viewed from the back face side, there is formed a notch 22D1 shaped like a bracket in the plan view from the upper edge towards the lower side as shown in FIG. 2. And, the notches 21D1, 22D1 are connected to each other to form an opening section 25 in the condition in which the upper case 21 and the lower case 22 are combined with each other. In the opening section 25, as shown in FIG. 2, there is fitted to be fixed a connecting terminal installing section 26 having an outline shape corresponding to the shape of the opening section 25.

The connecting terminal installing section 26, as shown in FIG. 2, hollows inward from the end faces of the back face sections 21D, 22D to form a cross-sectional shape of a substantially bracket shape, and provided with a plurality of holes 261 formed therein. And, as shown in FIG. 2, a plurality of connecting terminals 27 for inputting an image signal, an audio signal, and so on from external electronic equipment are exposed through the plurality of holes 261. Further, inside the connecting terminal installing section 26, there is disposed an interface board (not shown) for processing the signals input from the connecting terminals 27.

It should be noted that the interface board is electrically connected to a control board (not shown), and the signals processed in the interface board are output to the control board.

Further, in the back face section 22D, under the notch 22D1, there are formed two opening sections 22D2, 22D3 as shown in FIG. 2. And, as shown in FIG. 2, an inlet connector 28 is exposed through the opening section 22D2 located left in a back side view, making it possible to supply the main body of the projector 1 with electricity from the outside. Further, as shown in FIG. 2, a power switch 29 is exposed through the opening section 22D3 located right in the back side view, and by switching the power switch 29, it becomes possible to switch ON or OFF the main power of the projector 1.

It should be noted that the power switch 29 is electrically connected to the control board (not shown), and an operation signal caused by switching of the power switch 29 is output to the control board.

Further, in the front face section 22E, as shown in FIG. 1, there is formed a notch 22E1 shaped like a bracket in the plan view from the upper edge towards the lower side. And, the front case 23 is supported to be fixed by an inner section of the bracket-shaped notch 21E1 of the front face section 21E and an inner section of the bracket-shaped notch 22E1 of the front face section 22E in the condition in which the upper case 21 and the lower case 22 are combined.

Figure 3:
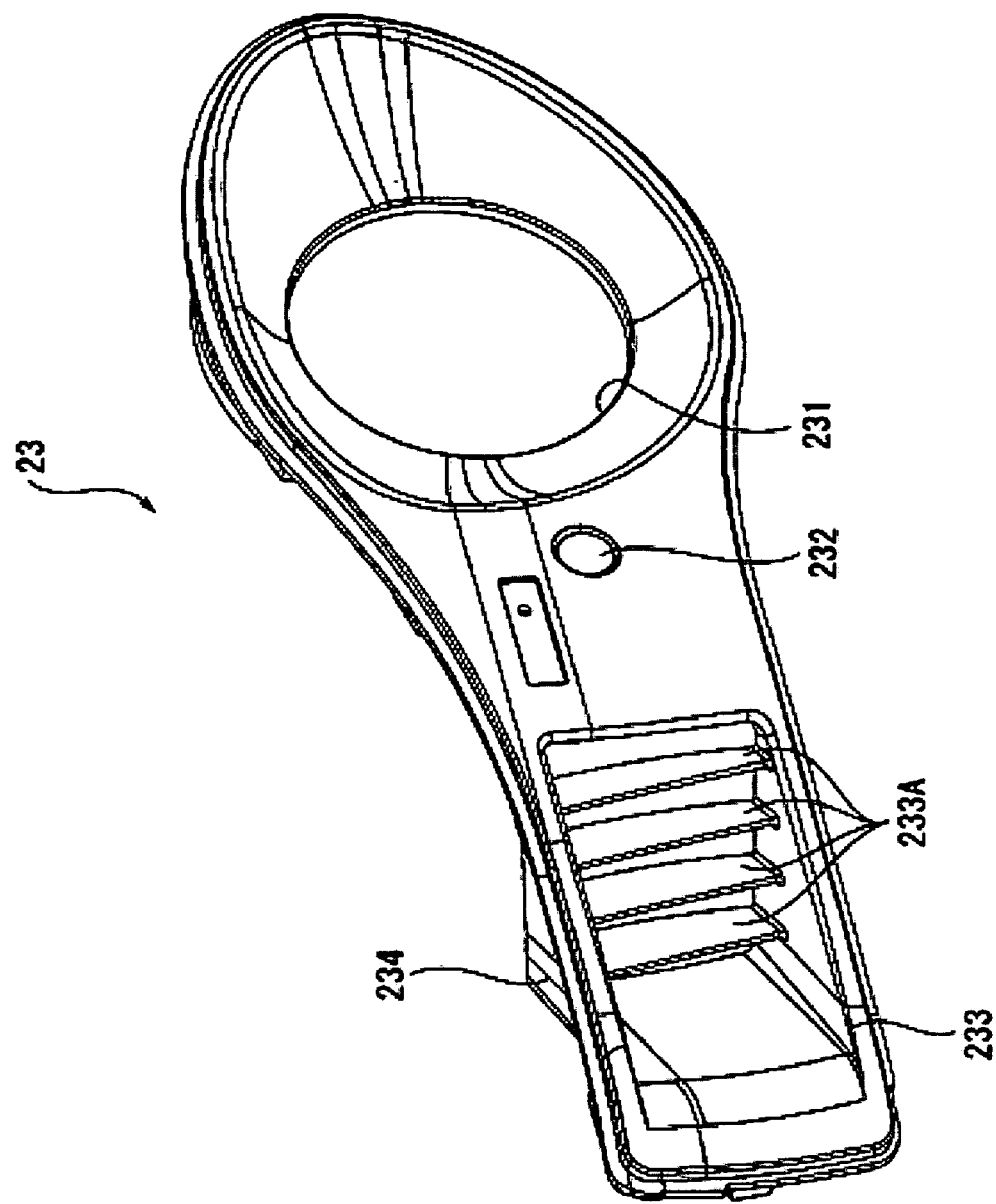
FIG. 3 is a perspective view showing an external appearance of a front case according to the embodiment.
Figure 4:
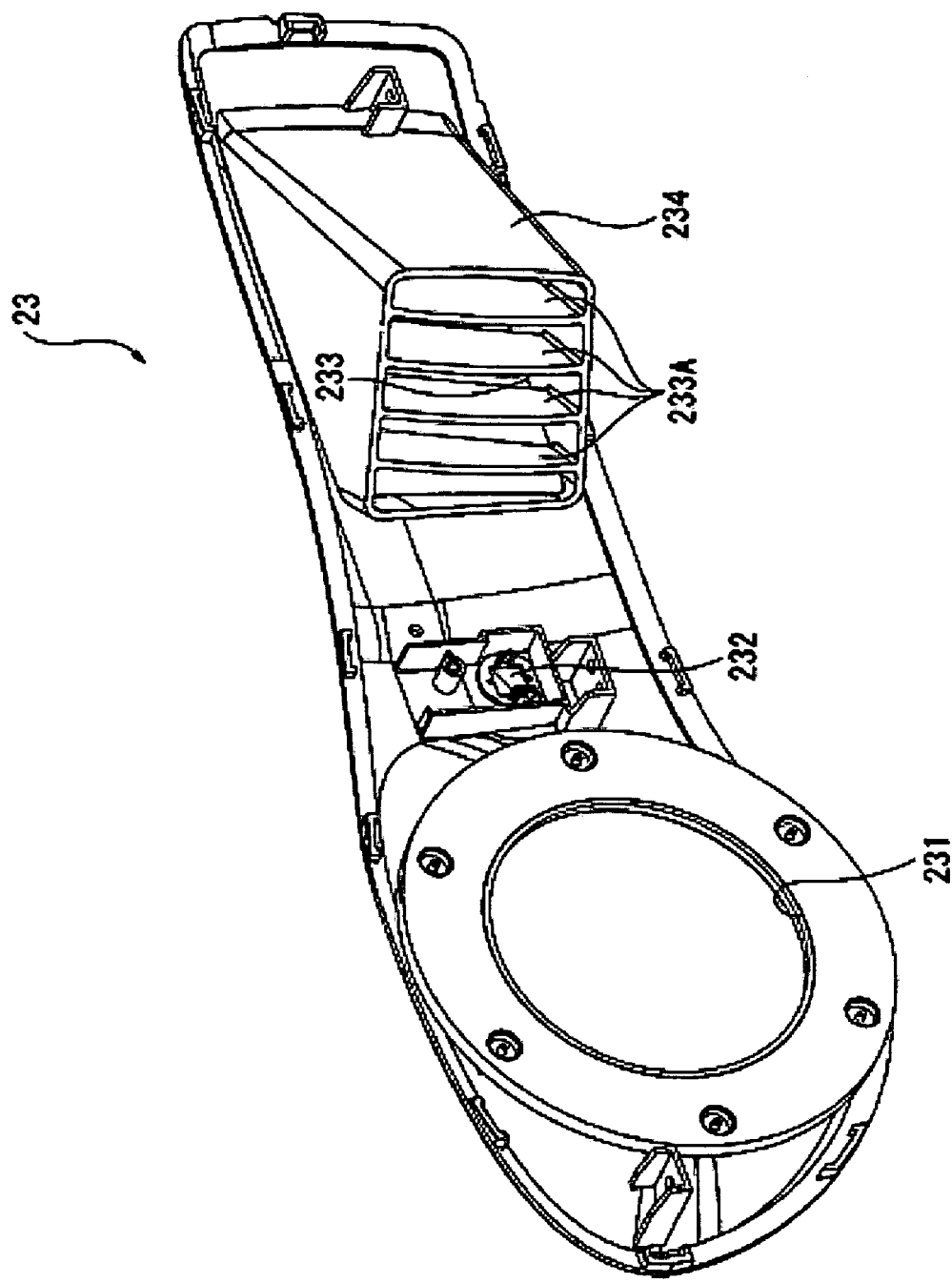
FIG. 4 is a perspective view showing an external appearance of the front case according to the embodiment.

FIGS. 3 and 4 are the perspective views showing the external appearance of the front case 23. Specifically, FIG. 3 is the perspective view showing the front case 23 viewed from a front side thereof. FIG. 4 is the perspective view of the front case 23 viewed from a rear side thereof.

The front case 23, as shown in FIG. 1, 3, or 4, has a substantially oval shape elongated in a horizontal direction, and closes up the opening section formed of the notches 21E1, 22E1 (shown in FIG. 1) when the upper case 21 and the lower case 22 are connected to each other.

In the right area of the front case 23 in the front view, as shown in FIG. 1, 3, or 4, there is formed a concave hollowing towards the inside of the exterior chassis 2 and having substantially circular opening 231 at the bottom thereof. And, the opening 231 exposes a tip portion of the projector lens 3.

Further, in the front case 23, at substantially the central section in the longitudinal direction there is formed a sensor window 232 for remote control, as shown in FIGS. 1, 3, or 4. And further, on the inner side of the sensor window 232 for the remote control, there is disposed a remote control sensor module (not shown) for receiving an operation signal from a remote controller (not shown).

It should be noted that the remote controller is provided with similar things to the start-up switch, the adjusting switch, and so on provided to the operation panel 24 described above. And, when the remote controller is operated, an infrared signal is output from the remote controller, and the infrared signal is received by the sensor module for remote control via the sensor window 232 for remote control, and then processed by the control board (not shown).

Further, in the front case 23, in the left area in the front view, there is formed an air outlet 233 having a substantially rectangular shape in the plan view for discharging air heated inside the projector 1 to the outside as shown in FIGS. 1, 3, and 4.

Further, on the peripheral section of the air outlet 233, there is integrally formed a louver 234 as a tubular section protruded towards the inside as shown in FIG. 1, 3, or 4. More specifically, the louver 234 is formed to have a tubular shape protruded from the peripheral section of the air outlet 233 towards a direction coming close to the projection lens 3 at a predetermined angle with a plane perpendicular to the projection direction of the projection lens 3. The predetermined angle is set to about 55 degrees in the present embodiment. And, in the inside section of the tubular shape of the louver 234, there are formed a plurality of louver boards 233A each built from the top to the bottom thereof and extended in the direction of the protrusion of the louver 234 as shown in FIG. 1, 3, or 4.

2. Internal Configuration

Figure 5:
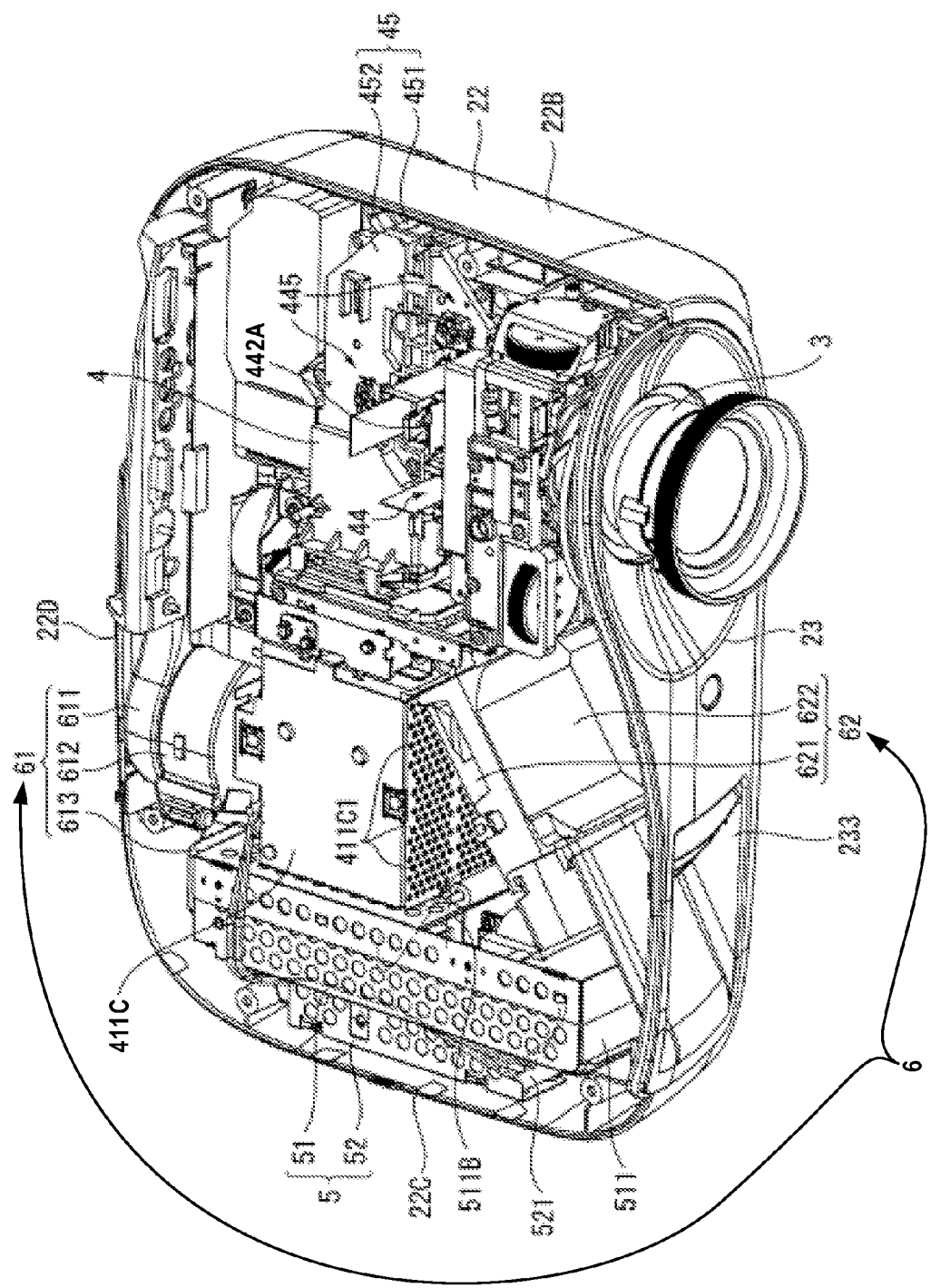
FIG. 5 is a view showing an internal configuration of the projector according to the embodiment.
Figure 6:
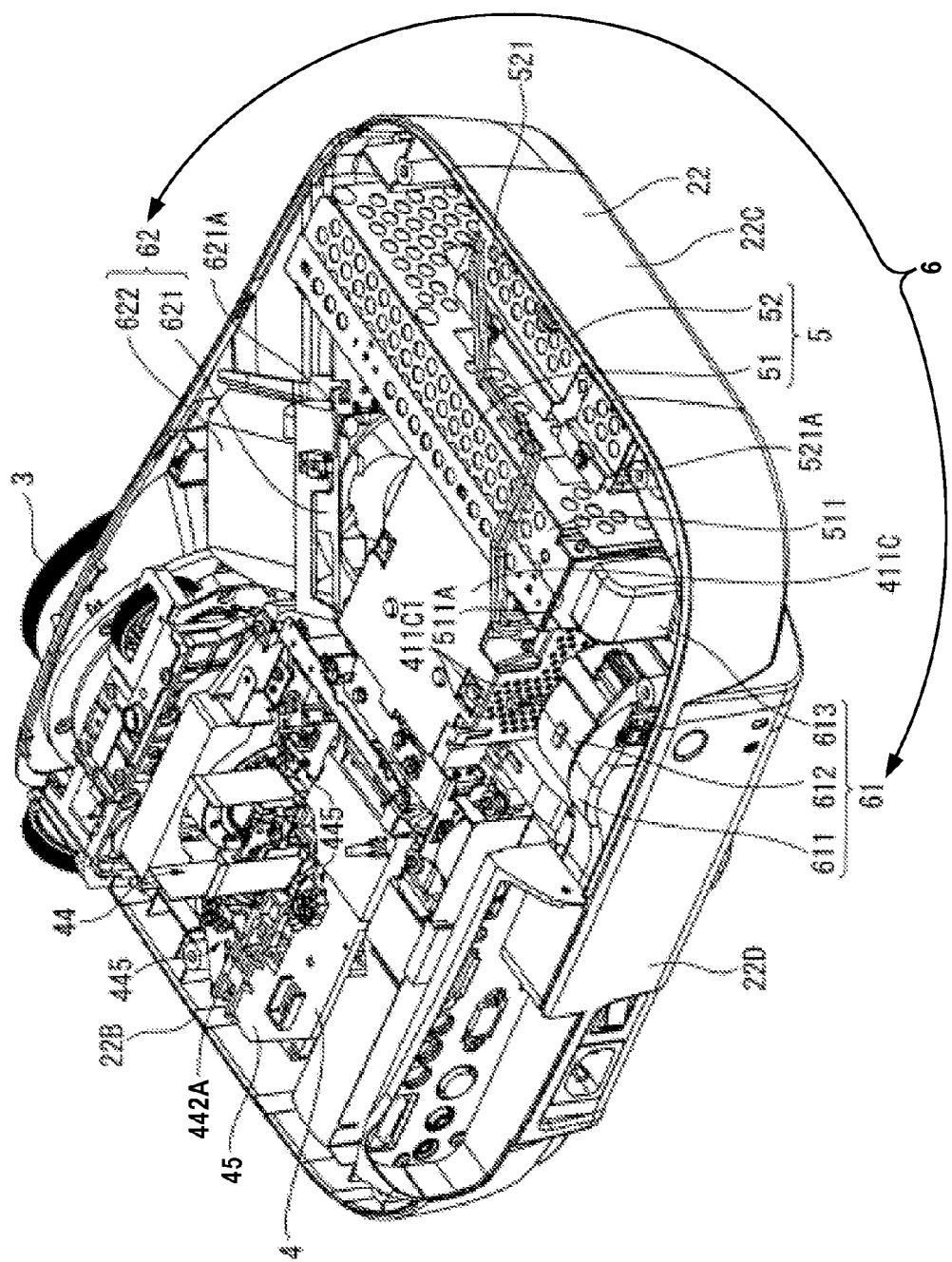
FIG. 6 is a view showing the internal configuration of the projector according to the embodiment.

FIGS. 5 and 6 are the views showing the internal configuration of the projector 1. Specifically, FIG. 5 is a perspective view of the condition with the upper case 21 and the control board removed therefrom viewed from the upper front side thereof. FIG. 6 is a perspective view of the condition with the upper case 21 and the control board removed therefrom viewed from the upper back side thereof.

Inside the exterior chassis 2, there is housed a main body of the projector 1 as shown in FIG. 5 or 6. The main body of the device is composed of an optical unit 4, a power supply unit 5 as a power supply device, a cooling unit 6, and so on.

It should be noted that, although not shown in the drawings, the main body of the device is provided with the control board disposed above the optical unit 4 and for controlling the projector 1 as a whole, besides the optical unit 4, the power supply unit 5, and the cooling unit 6.

3. Detailed Configuration of Optical Unit

FIG. 7 is a plan view schematically showing the optical system of the optical unit 4.

The optical unit 4 forms an image light beam in accordance with image information under control of the control board. The optical unit 4 has an L-shape in the plan view extending in a lateral direction along the back face sections 21D, 22D and extending towards the front along the side face section 21B, 22B in the exterior chassis 2 as shown in FIG. 5 or 6.

The optical unit 4 is provided with an integrator illuminating optical system 41, a color separator optical system 42, a relay optical system 43, an electro-optic device 44, and an optical component chassis 45 made of synthetic resin for housing these optical components 41 through 44 and for supporting and fixing the projection lens 3 at a predetermined position as shown in FIG. 7.

The integrator illuminating optical system 41 is an optical system for substantially equally illuminating an image forming area of each of liquid crystal panels described below forming the electro-optical device 44. The integrator illuminating optical system 41 is provided with a light source device 411, a first lens array 412, a second lens array 413, a polarization converter 414, and an overlapping lens 415 as shown in FIG. 7.

The light source device 411 is provided with a light source lamp 411A as a radial light source for emitting radial light beams, a reflector 411B for reflecting the radial light beams emitted from the light source lamp 411A, and a lamp housing 411C (shown in FIGS. 5 through 7). As the light source lamp 411A, a halogen lamp, a metal halide lamp, or a high-pressure mercury vapor lamp is often used. As a reflector 411B, a parabolic mirror is used. It should be noted that, besides the parabolic mirror, an ellipsoidal mirror can be used together with a concave collimation lens.

The lamp housing 411C is for accommodating the light source lamp 411A and the reflector 411B inside thereof, and is fixed to the bottom section of the lower case 22 and connected to the optical components chassis 45.

The first lens array 412 has a configuration in which small lenses each having a substantially rectangular outline viewed in the optical axis direction are arranged in a matrix. The small lenses divide the beam emitted from the light source lamp 411A into a plurality of partial light beams.

The second lens array 413 has substantially the same configuration as the first lens array 412, namely the configuration having small lenses arranged in a matrix. The second lens array 413 has the overlapping lens 415 and a function of focusing the image of the small lenses of the first lens array 412 on the liquid crystal panel described below.

The polarization converter 414 is disposed posterior to the second lens array 413 in the optical path. Such a polarization converter 414 is for converting the light from the second lens array 413 into a substantially single polarized light beam, and thus the light efficiency in the electro-optic device 44 is enhanced.

Specifically, each of the partial light beams converted into a substantially single polarized light beam by the polarization converter 414 is finally overlapped substantially on each of the liquid crystal panels of the electro-optic device 44 described later by the overlapping lens 415. In the projector 1 of the present embodiment using the liquid crystal panel of a type of converting polarized light beams, since only a single polarized light beam is available, a half of light beam from the light source lamp 411A for emitting other random polarized light beams is not available. Therefore, by using the polarization converter 414, almost whole of the light beam emitted from the light source lamp 411A is converted into a single polarized light beam, thereby enhancing light efficiency in the electro-optic device 44.

The color separator optical system 42 is provided with two dichroic mirrors 421, 422 and a reflecting mirror 423, and has a function of separating the plurality of partial light beams emitted from the integrator illuminating optical system 41 into three colored light beams of red, green, and blue by the dichroic mirrors 421, 422.

The relay optical system 43 is provided with an entrance lens 431, a relay lens 433, and reflecting mirrors 432, 434, and has a function of guiding the colored light beams separated by the color separator optical system 42 to the liquid crystal panel for the blue light beam.

In this case, the dichroic mirror 421 of the color separator optical system 42 transmits the blue light component and the green light component of the light beam emitted from the integrator illuminating optical system 41, and reflects the red light component thereof. The red light beam reflected by the dichroic mirror 421 is further reflected by the reflecting mirror 423 and reaches the liquid crystal panel for the red light beam through a field lens 417. The field lens 417 converts each of the partial light beams emitted from the second lens array 413 into a light beam parallel to the center axis (principal ray). The same applies to the field lenses 417 each provided to the light entrance side of the respective liquid crystal panels for other green light and blue light.

Out of the blue light beam and the green light beam transmitted through the dichroic mirror 421, the green light beam is reflected by the dichroic mirror 422, and reaches the liquid crystal panel for the green light beam through the field lens 417. Meanwhile the blue light beam is transmitted through the dichroic mirror 422, passes through the relay optical system 43, and then reaches the liquid crystal panel for the blue light beam through the field lens 417. It should be noted that the relay optical system 43 is used for the blue light beam for preventing degradation of light efficiency caused by the diffusion of the blue light beam having the optical path longer than the optical paths of other colored light beams. Namely, it is provided for transmitting the partial light beams entering the entrance lens 431 directly to the field lens 417. It should be noted that, although it is configured that the blue light beam out of the three colored light beams is transmitted in the relay optical system 43, the configuration is not limited thereto, and it can also be configured that the red light beam is transmitted therein, for example.

The electro-optic device 44 is provided with three liquid crystal panels 441 (assuming that a liquid crystal panel for the red light beam is denoted with 441R, a liquid crystal panel for the green light beam is denoted with 441G, and a liquid crystal panel for the blue light beam is denoted with 441B) forming a light modulating device, polarization plates 442, field angle correction plates 444, and a cross dichroic prism 443.

The liquid crystal panel 441 uses, for example, polysilicon thin film transistors (TFT) as switching elements, and each of the colored light beams separated off by the color separator optical system 42 is modulated by respective one of the three liquid crystal panels 441 and polarization plates 442 disposed on both entrance and exit sides of the liquid crystal panel in accordance with the image information to form the optical image.

The polarization plate 442 is provided with an entrance polarization plate 442A and an exit polarization plate 442B disposed on anterior and posterior of the liquid crystal panel 441, respectively, in the optical path.

The entrance polarization plate 442A is for transmitting only a polarized light beam with a predetermined polarizing direction out of each of the colored light beams separated off by the color separator optical system 42 and absorbing other light beams, and is composed of a substrate made of quartz crystal, sapphire, or the like with a polarization film attached thereto. And, the entrance polarization plate 442A is disposed so that the position of the entrance polarization plate can be adjusted with respect to a predetermined illuminating optical axis defined inside the optical component chassis 45 by a position adjustment mechanism forming the optical component chassis 45 described later.

The exit polarization plate 442B is also configured similarly to the entrance polarization plate 442A, and is for transmitting only the polarized light beam with the predetermined polarizing direction out of the light beams emitted from the liquid crystal panel 441 and absorbing other light beams. Further, it can be realized by attaching the polarization film to the cross dichroic prism 443 without using the substrate, or by attaching the substrate to the cross dichroic prism 443.

The entrance polarization plate 442A and the exit polarization plate 442B are arranged to have polarization axes, respectively, whose directions are perpendicular to each other.

The field angle correction plate 444 is provided with an optical conversion film formed on the substrate and having a function of correcting the field angle of the optical image formed by the liquid crystal panel 441. By disposing the field angle correction plate 444 as described above, light leakage on the black screen can be reduced, thus the contrast of the projected image can dramatically be improved. And, similarly to the entrance polarization plate 442A, the field angle correction plate 444 is disposed so that the position of the field angle correction plate can be adjusted with respect to a predetermined illuminating optical axis defined inside the optical component chassis 45 by a position adjustment mechanism forming the optical component chassis 45 described later.

The cross dichroic prism 443 is for combining images each modulated for corresponding colored light beam emitted from respective one of the three liquid crystal panels 441 to form a color image. It should be noted that the cross dichroic prism 443 is composed of a dielectric multilayer film for reflecting red light and a dielectric multilayer film for reflecting blue light formed along the boundary faces of four rectangular prisms to form a substantially X shape, and the three colored light beams are combined by these dielectric multilayer films.

The optical systems 41 through 44 as described above are housed inside the optical component chassis 45.

As shown in FIGS. 5 through 7, the illuminating optical axis A (shown in FIG. 7) of the light beam emitted from the light source device 411 is defined inside the optical component chassis 45, and the optical component chassis 45 is composed of a component housing member 451 (shown in FIGS. 5 and 7) shaped like a container provided with grooves (not shown) for respectively fitting the optical components 412 through 415, 417, 421 through 423, 431 through 434, 442A, and 444 described above by sliding them from above, a lid member 452 shaped like a lid for closing the upper opening of the component housing member 451, and the position adjustment mechanism 445 (shown in FIGS. 5 and 6) including a part of the lid member 452 and for performing the position adjustment of both of the entrance polarization plate 442A and the field angle correction plate 444.

Further, in one end of the optical component chassis 45 having a substantially L-shape in the plan view, there is disposed the light source device 411 at a predetermined position with respect to the illuminating optical axis A (shown in FIG. 7), and in the other end thereof, there is fixed the projection lens 3 at a predetermined position with respect to the illuminating optical axis A. Still further, the electro-optic device 44 is fixed anterior to the projection lens 3 in the optical path.

And, as shown in FIG. 7, the light source device 411, the integrator illuminating optical system 41, the color separator optical system 42, the relay optical system 43, the electro-optic device 44, and the projection lens 3 are disposed sequentially in a direction from the one end to the other end. And, it is configured to form the L-shape in the plan view in the condition in which the optical unit 4 and the projection lens 3 are combined with each other.

In the preset embodiment, the projection lens 3 and the optical unit 4 correspond to an image projecting device according to the invention.

4. Configuration of Power Supply Unit

Figure 8:
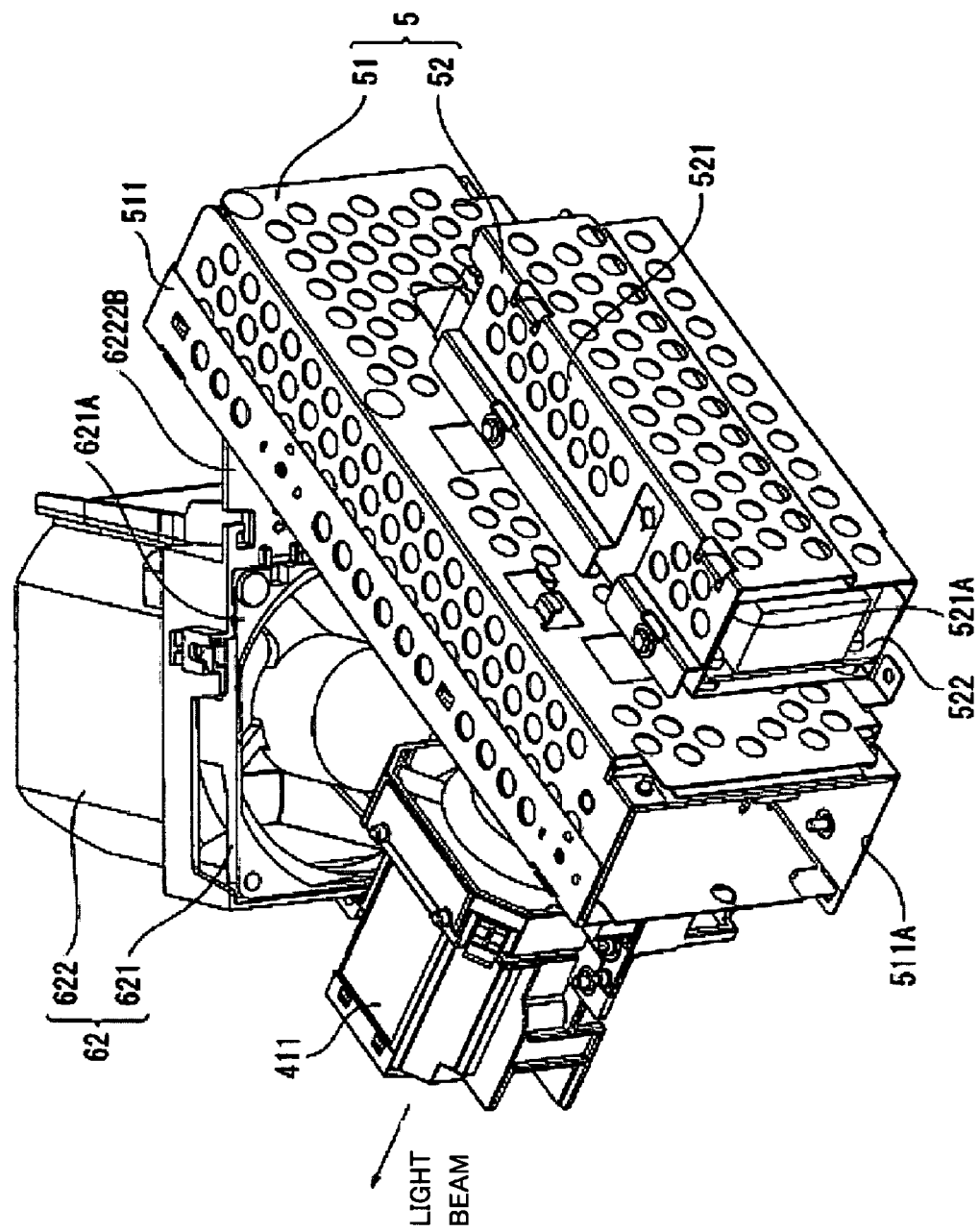
FIG. 8 is a view for showing layout positions of a power supply unit, a light source unit, and a cooling air discharging section forming a cooling unit according to the embodiment.
Figure 9:
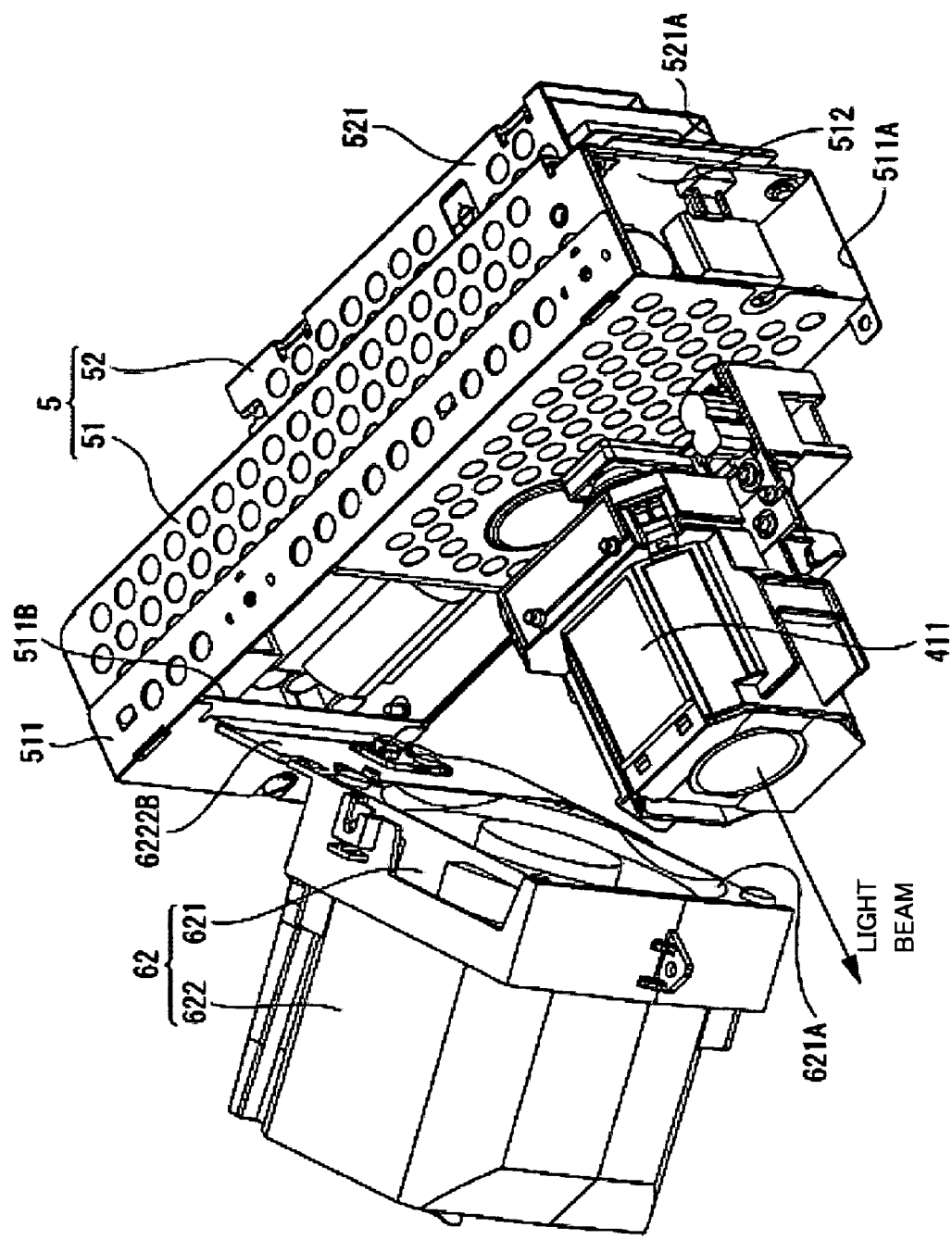
FIG. 9 is a view for showing layout positions of the power supply unit, the light source unit, and the cooling air discharging section forming the cooling unit according to the embodiment.

FIGS. 8 and 9 are views for showing layout positions of a power supply unit 5, the light source device 411, and a cooling air discharging section 62 forming a cooling unit 6. Specifically, FIG. 8 is a view showing the power supply unit 5, the light source device 411, and the cooling air discharging section 62 viewed from the back side of the projector 1 and the side of the side faces 21C, 22C. FIG. 9 is a view showing the power supply unit 5, the light source device 411, and the cooling air discharging section 62 viewed from the back side thereof and the side of the side faces 21B, 22B.

The power supply unit 5 is for supplying the composing members with electricity supplied from the outside via the inlet connector 28 (shown in FIG. 2). As shown in FIG. 5, 6, 8, or 9, the power supply unit 5 is provided with a power supply block 51 and a lamp drive block 52.

The power supply block 51 is disposed at the side (the opposite side of the light beam emission side) of the light source device 411, and supplies the lamp drive block 52, the control board, and so on with the electricity supplied form the outside via the inlet connector 28. As shown in FIG. 5, 6, 8, or 9, the power supply block 51 is provided with a circuit board 512 (shown in FIG. 9) having a transformer for converting alternating current voltage into a predetermined voltage, a converter circuit for converting the output of the transformer into a predetermined direct current voltage, and so on mounted on one surface thereof, and a box-like member 511 for covering the circuit board 512.

As shown in FIG. 5, 6, 8, or 9, the box-like member 511 has a shape extending in an anteroposterior direction (projection direction of the projector lens 3) so as to form a substantially L shape together with the light source device 411. And, the box-like member 511 is provided with a first inlet 511A (shown in FIGS. 6, 8, and 9) formed in the back face side of the projector 1 and for leading the air from the cooling unit 6 inside thereof, and an outlet 511B (shown in FIGS. 5 and 9) formed inner end face of the substantially L-shaped block formed in conjunction with the light source device 411 and for discharging the inside air to the outside. Further, although not shown in the drawings, the box-like member 511 is provided with a second inlet formed on the end face distant from the light source device 411 and for leading in the air discharged from the lamp drive block 52.

As shown in FIG. 5, 6, 8, or 9, the lamp drive block 52 is disposed at the side of the power supply block 51 and along the side face sections 21C, 22C (shown in FIGS. 5 and 6), and provided with a circuit board 522 (shown in FIG. 8) having a converter circuit for supplying the light source device 411 with electricity with a stable voltage and so on mounted on one surface thereof, and the commercial alternating current input from the power supply block 51 is rectified or converted into direct current or alternating current rectangular wave by the lamp drive block 52, and supplied to the light source device 411. Further, the circuit board 522 of the lamp drive block 52 is housed inside a box-like member 521 similarly to the power supply block 51.

As shown in FIG. 5, 6, 8, or 9, the box-like member 521 has a shape extending in the anteroposterior direction parallel to the box-like member 511. And, the box-like member 521 is provided with an inlet 521A (shown in FIGS. 6, 8, and 9) formed on the back face side and for leading the air from the cooling unit 6 inside thereof, and an outlet (not shown) formed on the end face opposing the box-like member 511 and corresponding to the second inlet of the box-like member 511 and for discharging the inside air to the outside.

5. Configuration of Cooling Unit

The cooling unit 6 is for cooling the composing elements inside the projector 1. As shown in FIG. 5, 6, 8, or 9, the cooling unit 6 is composed of a power supply unit cooling section 61 (shown in FIGS. 5 and 6) for cooling mainly the power supply unit 5, a cooling air discharging section 62 as a ventilation device for discharging the air inside the projector 1 to the outside, and so on.

It should be noted that, although not specifically shown in the drawings, the cooling unit 6 is also provided with a liquid crystal panel cooling section composed of a cooling fan and a duct for cooling each of the liquid crystal panels 441 and the polarization converter 414, and so on.

As shown in FIG. 5 or 6, the power source unit cooling section 61 is disposed in a space between a block composed of the light source device 411 and the power supply unit 5 and the back face sections 21D, 22D of the exterior chassis 2. As shown in FIG. 5 or 6, the power supply unit cooling section 61 is provided with an air inlet duct 611, a sirocco fan 612, and a first air outlet duct 613.

As shown in FIG. 5 or 6, the air inlet duct 611 is formed to extend from an inlet (not shown) for leading the air inside thereof connected to an air inlet (not shown) provided to the lower case 22 along the back face sections 21D, 22D to an outlet (not shown) provided to the tip section thereof in the extending direction and for discharging the inside air to the outside so that the outlet is set towards the front face side.

As shown in FIG. 5 or 6, the sirocco fan 612 is disposed in the back face side of the light source device 411 so that a suction port (not shown) for sucking in the air is set towards the back face side to be connected to the outlet of the air inlet duct 611 and the direction of the air discharged from a discharge port (not shown) for discharging the air is set towards the side face sections 21C, 22C along the bottom face of the lower case 22.

As shown in FIG. 5 or 6, the first air outlet duct 613 is formed so as to have an inlet (not shown) for leading the air inside thereof connected to the discharge port of the sirocco fan 612, to extend towards the back face side of the power source unit 5, and to have a tip section in the extending direction divided into two branches. And, one of the branches extends to the back face side of the box-like member 511 forming the power supply unit 5, and the other of the branches extends to the back face side of the box-like member 521 forming the power supply unit 5. An outlet (not shown) formed on the tip of each of the branches of the tip section in the extending direction and for discharging the inside air to the outside faces the respective one of the inlets 511A, 521A of the box-like members 511, 521.

And, when the sirocco fan 612 is driven, the cooling air outside the projector 1 is led inside thereof through the air inlet provided to the lower case 22, and then led inside the power supply unit 5 through the air inlet duct 611 and the first air outlet duct 613. The air led inside the box-like member 521 of the power supply unit 5 is led inside the box-like member 511 through the outlet and the second inlet of the box-like member 511. In the inside of the box-like member 521, the circuit board 522 of the lamp drive block 52 is cooled while the air flows from the inlet 521A to the outlet. Further, the air led inside the box-like member 511 of the power supply unit 5 is discharged to an area surrounded by the substantially L-shaped block composed of the box-like member 511 and the light source device 411 through the outlet 511B. In the inside of the box-like member 511, the circuit board 512 of the power source block 51 is cooled while the air flows from the first inlet 511A and the second inlet to the outlet 511B.

Figure 10:
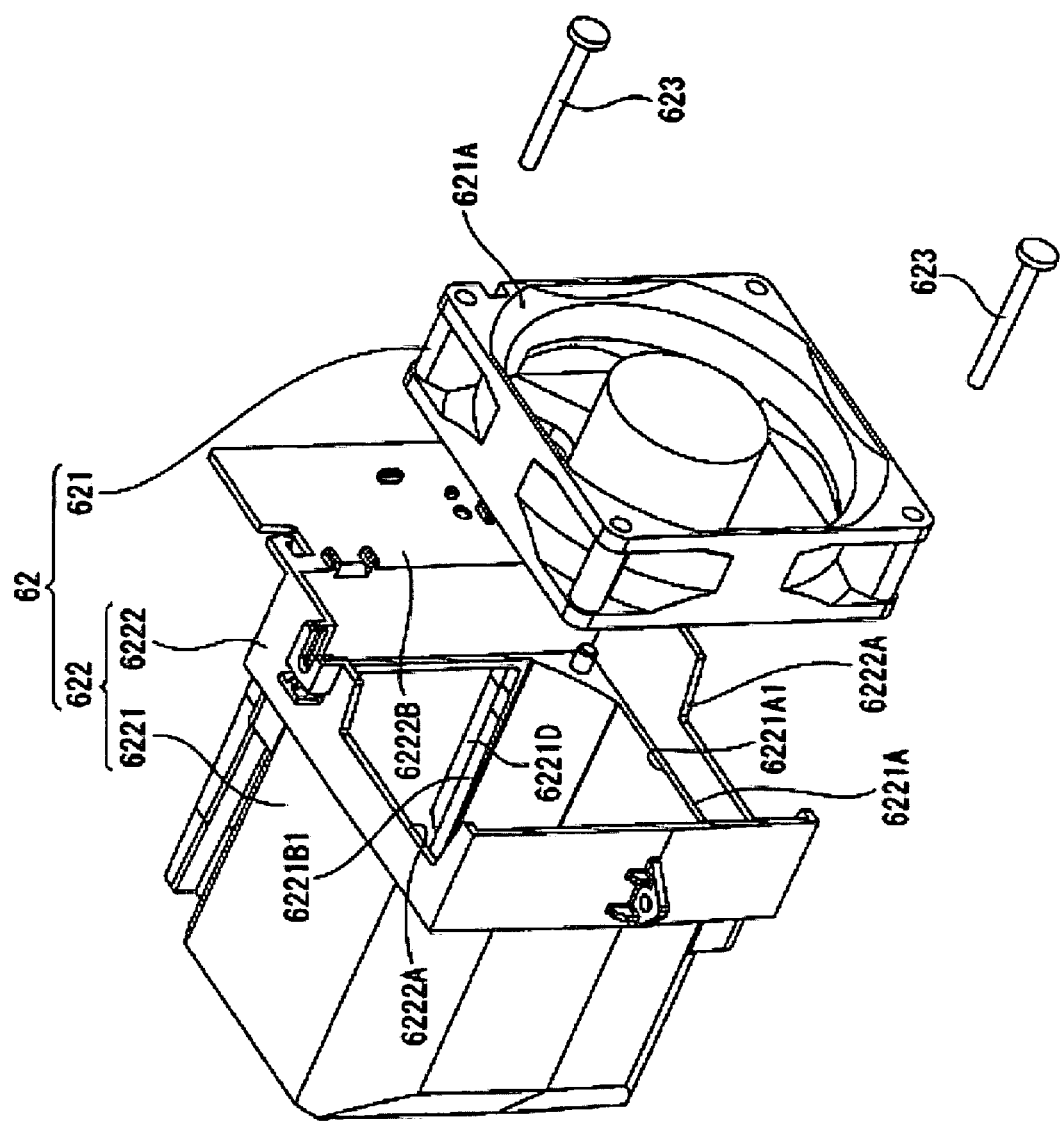
FIG. 10 is an exploded perspective view showing the cooling air discharging section according to the embodiment.
Figure 11:
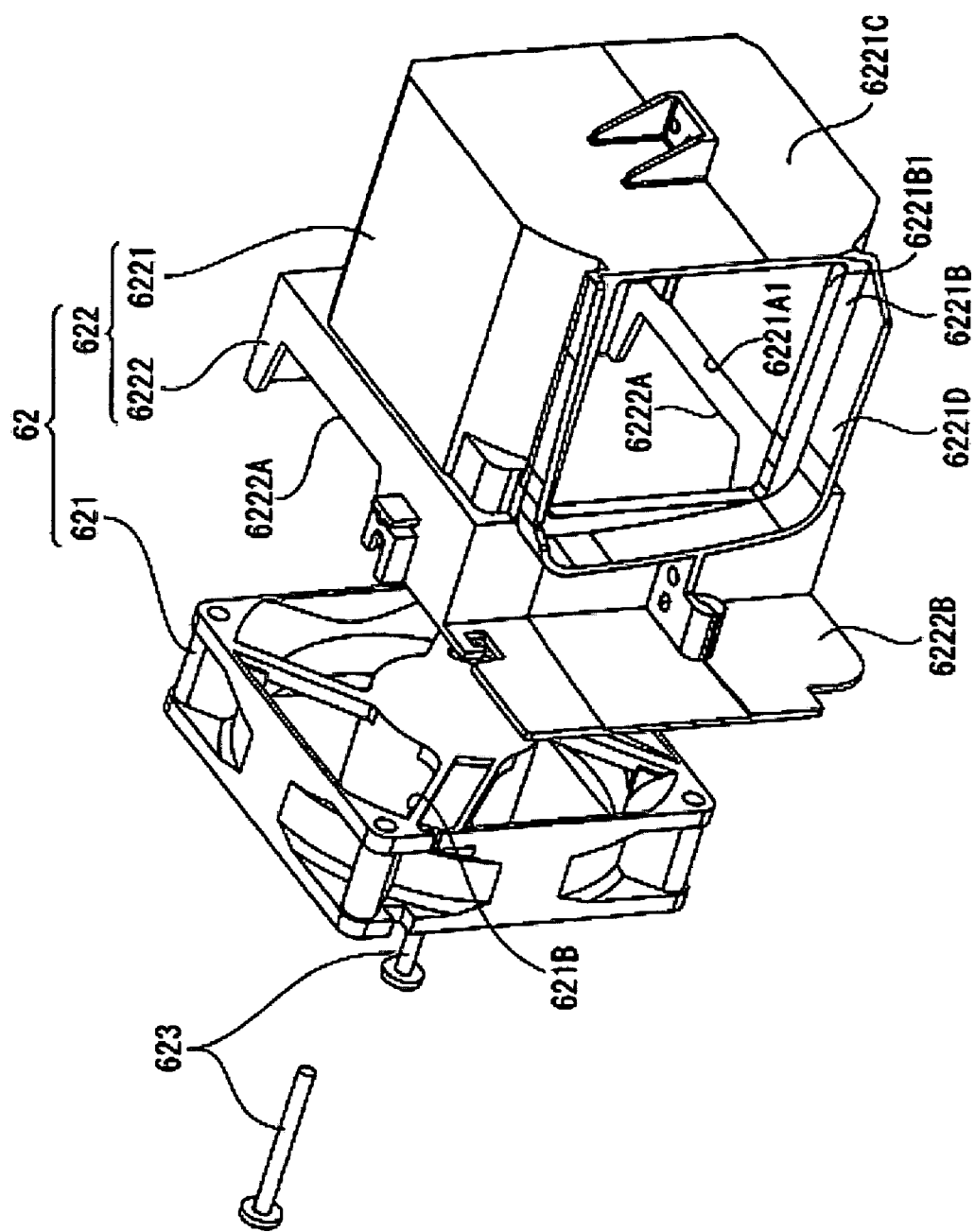
FIG. 11 is an exploded perspective view showing the cooling air discharging section according to the embodiment.

FIGS. 10 and 11 are the exploded perspective views showing the schematic configuration of the cooling air discharging section 62. Specifically, FIG. 10 is an exploded perspective view of the cooling air discharging section 62 viewed from the back face side and the side of the side face sections 21B, 22B. FIG. 11 is an exploded perspective view of the cooling air discharging section 62 viewed from the front face side and the side of the side face sections 21C, 22C.

As shown in FIG. 5 or 6, the cooling air discharging section 62 is disposed in an area surrounded by the substantially L-shaped block composed of the projection lens 3 and the optical unit 4 (an area surrounded by the substantially L-shaped block composed of the light source device 411 and the box-like member 511). As shown in FIGS. 5, 6, and 8 through 11, the cooling air discharging section 62 is provided with an axial fan 621 and a second air outlet duct 622.

The axial fan 621 is disposed at the front face side of the light source device 411 so that a discharge port (discharge face) 621B (shown in FIG. 11) for discharging the air is set towards the projection lens 3 side, and a suction port (suction face) 621A (shown in FIGS. 6, and 8 through 10) for sucking in the air and the discharge port 621B are set at a predetermined angle (substantially the same angle as the angle formed by a plane perpendicular to the projection direction (the anteroposterior direction of the projector 1) of the projection lens 3 with the protruding direction of the louver 234) with the plane perpendicular to the projection direction. The predetermined angle is set to about 55 degrees in the present embodiment. More specifically, the axial fan 621 is disposed so that the suction port 621A faces the area surrounded by the substantially L-shaped block composed of the light source device 411 and the box-like member 511, and as shown in FIG. 5, 6, 8, or 9, the axial fan 621, the light source device 411, and the box-like member 511 form a triangle space in the plan view.

As shown in FIG. 10 or 11, the second air outlet duct 622 is composed of a duct body 6221 and an axial fan connecting section 6222 integrated with each other, and is a member for leading the air discharged from the axial fan 621 to the louver 234 of the front case 23. The second air outlet duct 622 is a molding formed by being divided with a horizontal plane into parts, and is configured to be formed as the duct body 6221 and the axial fan connecting section 6222 by combining the parts in the vertical direction.

As shown in FIG. 10 or 11, the duct body 6221 is composed of a substantially cuboid shaped hollow member, and is provided with an inlet 6221A1 (shown in FIG. 10) for leading the air inside and an outlet 6221B1 (shown in FIG. 11) for discharging the inside air to the outside formed on one side face 6221A (shown in FIG. 10) and another side face 6221B (shown in FIG. 11) intersecting with the one side face 6221A, respectively. Namely, the inlet 6221A1 and the outlet 6221B1 are positioned at an angle of substantially 90 degrees with each other.

As shown in FIG. 10 or 11, the inlet 6221A1 and the outlet 6221B1 are each formed in substantially the whole area of the respective one of the side end faces 6221A, 6221B.

It should be noted here that the side end face 6221A is formed square in accordance with the outer shape of the axial fan 621 as shown in FIG. 10.

And, the distance between the side end face 6221A and the side end face 6221C (shown in FIG. 11) opposing the side end face 6221A is preferably no smaller than a half the size of vertical or horizontal length of the side end face 6221A.

In the present embodiment, the distance between the side end faces 6221A, 6221C is set substantially equal to the size of the vertical or horizontal length of the side end face 6221A. Namely, in the present embodiment, the duct body 6221 is designed to have a substantially cubic shape.

Further, as shown in FIG. 11, on the periphery section of the outlet 6221B1, there is formed a louver connecting section 6221D surrounding the outlet 6221B1, protruding in an outer direction of the side end face 6221B, and having a bracket-like shape in the plan view.

And, in the condition in which the second air outlet duct 622 is disposed inside the exterior chassis 2, the louver connecting section 6221D abuts on the tip portion of the louver 234 of the front case 23 in the protruding direction thereof, and the air discharged through the outlet 6221B1 is led inside the louver 234.

As shown in FIG. 10 or 11, the axial fan connecting section 6222 is provided to the side end face 6221A, and has a rectangular frame shape in the plan view protruding in an outer direction of the side end face 6221A and surrounding the inlet 6221A1. And, the axial fan 621 is fitted inside the rectangular shape in the plan view of the axial fan connecting section 6222, and is fixed to the side end face 6221A with setscrews 623.

As shown in FIG. 10 or 11, in the axial fan connecting section 6222, there are formed bracket shaped notches 6222A in the plan view in the upper and the lower walls, respectively, from the tip edges in the protruding direction of the walls towards the anchor side thereof. According to the notches 6222A, the axial fan 621 can be grasped by hand in, for example, detaching the axial fan 621 from the axial fan connecting section 6222, thus the replacement work of the axial fan 621 can easily be executed.

Further, as shown in FIG. 10 or 11, in the axial fan connecting section 6222, on the tip edge of the right side end face in the protruding direction thereof viewed from the front of the axial fan connecting section 6222, there is formed a current plate 6222B extending rightward in parallel to the side end face 6221A viewed from the front thereof. And, as shown in FIG. 8 or 9, in the condition in which the second air outlet duct 622 is disposed inside the exterior chassis 2, the edge of the current plate 6222B in the extending direction thereof abuts on the end face of the box-like member 511 (the end face facing the area surrounded by the substantially L-shaped block composed of the light source device 411 and the box-like member 511) to close the gap formed between the cooling air discharging section 62 and the box-like member 511. By thus providing the current plate 6222B, the air in the area surrounded by the substantially L-shaped block composed of the light source device 411 and the box-like member 511 can effectively be sucked in by the axial fan 621.

And, when the axial fan is driven, the air (the air discharged through the power supply unit 5 and so on) in the area surrounded by the substantially L-shaped block composed of the light source device 411 and the box-like member 511 and the air in other spaces are sucked in by the axial fan 621. Further, the air discharged from the axial fan 621 flows through the second air outlet duct 622 while being bent by the side end face 6221C inside the duct at an angle of substantially 90 degrees towards a direction of receding from the projection lens 3, and is discharged to the outside of the projector 1 through the louver 234 and the air outlet 233 in the direction of receding from the projection direction of the projector lens 3. Namely, in the present embodiment, the side end face 6221C extending perpendicular to the air discharging direction of the axial fan 621 corresponds to a vertical wall according to the invention.

More specifically, as shown in FIG. 5 or 6, the lamp housing 411C forming the light source device 411 is provided with a plurality of openings 411C1 allowing the air to circulate between inside and outside thereof formed in each of the end faces facing in the anteroposterior direction, and when the axial fan 621 is driven, the inside air of the lamp housing 411C is sucked in by the axial fan 621 through the plurality of openings 411C1. In the lamp housing 411C, while the air circulates through the plurality of openings 411C1, the light source lamp 411A and the reflector 411B are cooled.

As explained above, in the present embodiment, the second air outlet duct 622 is provided with the vertical wall 6221C substantially perpendicular to the air discharging direction of the discharge port 621B of the axial fan 621. Therefore, a sound generated by the axial fan 621 when the axial fan 621 is driven and conducted inside the second air outlet duct 622 can be insulated by the vertical wall 6221C. Therefore, the sound from the axial fan 621 conducted inside the second air outlet duct 622 can be prevented from leaking outside the projector 1 via the air outlet 233, thus the silentness of the projector 1 can be assured. Further, since the vertical wall 6221C is substantially perpendicular to the discharging direction, if the sound from the axial fan 621 is reflected by the vertical wall 6221C, the sound is prevented from proceeding towards the air outlet 233, thus the sound from the axial fan 621 can effectively be insulated.

Further, in the second air outlet duct 622, if leakage light inside the projector 1 enters the inside of the duct via the inlet 6221A1, the leakage light can be blocked by the vertical wall 6221C. Therefore, it can be prevented that the leakage light is conducted inside the second air outlet duct 622 and leaks outside the projector 1 via the air outlet 233, thus it is prevented to cause uncomfortable feeling to those appreciating the image projected by the projector 1. Further, since the vertical wall 6221C is substantially perpendicular to the discharging direction, if the leakage light is reflected by the vertical wall 6221C, it can be prevented from proceeding towards the air outlet 233, thus the leakage light can effectively be blocked.

Further, since the axial fan 621 is disposed at a predetermined angle with the projection direction, and the second air outlet duct 622 is configured to lead the air discharged from the discharge port 621B of the axial fan 621 to the air outlet 233 while being bent by the vertical wall 6221C at an angle of substantially 90 degrees towards the side receding from the projecting lens 3 in the cooling air discharging section 62, fluctuation on the projected image can be prevented from being caused by the exhaust stream discharged outside the projector 1 through the air outlet 233.

As described above, by arranging the disposition of the axial fan 621 and the shape of the second air outlet duct 622 to form a substantially L-shaped air flow path from the axial fan 621 to the air outlet 233 bending at an angle substantially 90 degrees, a structure capable of blocking the leakage light to the outside of the exterior chassis 2 with a second air outlet duct 622 having a simple shape and a simple structure, and preventing fluctuation on the projected image from being caused by the exhaust stream can be realized without adopting the conventional structure in which the exhaust duct is provided with a louver for bending the exhaust stream. Further, by adopting such a structure, a plurality of louver boards extending in a direction traversing the air flow direction inside the exhaust duct for bending the exhaust stream towards a direction of receding from the projection direction of the projection lens 3 can be eliminated. Since the air inside the exterior chassis 2 can effectively be discharged by the cooling air discharging section 62 without degrading the air discharging efficiency by the plurality of louver boards, enhancement of cooling efficiency of the light source device 411 can be achieved.

It should be noted here that, since the axial fan 621 is disposed so as to form the triangle space in the plan view in conjunction with the light source device 411 and the power supply unit 5, the air adjacent to the light source device 411 heated by the light source device 411 and the air adjacent to the power supply unit 5 heated by the power supply unit 5 can be sucked in a lump, thus both of the light source device 411 and the power supply unit 5 can efficiently be cooled. Further, according to the layout described above, the axial fan 621 can be disposed at a position nearer to the center of the projector 1, thus the noise caused by the fan can be prevented from being conducted to the outside.

Further, since the louver 234 is provided to the front case 23, the air outlet 233 and the second air outlet duct 622 can be connected with the louver 234, thus the air discharged from the axial fan 621 can be allowed to flow through the air flow path going through the second air outlet duct 622, the louver 234, and the air outlet 233, and can effectively be discharged outside the projector 1 through the air outlet 233 without increasing the second air outlet duct 622 in size.

Further, since the exterior chassis 2 is a molding made of synthetic resin, and the front case 23 is separately configured from the upper case 21 and the lower case 22, the louver 234 can easily be formed integrally with the exterior chassis 2 (front case 23).

And, since the duct body 6221 of the second air outlet duct 622 is composed of a substantially cuboid hollow member, by forming the inlet 6221A1 in one side end face 6221A of the substantially cuboid shape and forming the outlet 6221B1 in the side end face 6221B intersecting with the one side end face 6221A, the air discharged from the axial fan 621 and led inside through the inlet 6221A1 can be discharged through the outlet 6221B1 after changed in direction by the vertical wall 6221C as the side end face opposing the one side end face 6221A at an angle substantially 90 degrees. Therefore, the shape of the second air outlet duct 622 can be simplified, and accordingly, the second air outlet duct 622 can easily be manufactured.

Incidentally, in the duct body, if the distance between the one side end face in which the inlet is formed and the side end face (the vertical wall) opposing the one side end face is set smaller than a half the vertical or the horizontal size of the one side end face having a square shape in the plan view, the opening area of the outlet formed in the side end face intersecting with the one side end face becomes smaller than a half the opening area of the inlet. In this case, the air discharging efficiency in the cooling air discharging section 62 is lowered, and it becomes difficult to achieve enhancement of the cooling efficiency of the light source device 411.

In the present embodiment, since the second air outlet duct 622 is arranged to have the distance between the side end face 6221A in which the inlet 6221A1 is formed and the vertical wall 6221C substantially the equal to the horizontal size or the vertical size of the square shape of the side end face 6221A in the plan view, the opening area of the outlet 6221B1 and the opening area of the inlet 6221A1 can be set substantially the equal, thus the air inside the exterior chassis 2 can effectively be discharged outside thereof by the cooling air discharging section 62 without degrading the air discharging efficiency in the cooling air discharging section 62, thereby achieving enhancement of cooling efficiency of the light source device 411.

Further, since the outlet 511B of the power supply unit 5 is not disposed linearly with the air outlet 233, the sound (noise) in the high-frequency band generated from the circuit boards 512, 522 does not leak outside the projector 1 via the outlet 511B or the air outlet 233. Thus, the silentness of the projector 1 is assured, and uncomfortable feeling is never caused to those appreciating the projection image by the projector 1.

Note that the invention is not limited to the embodiments described above but includes modifications and improvements in a range where the advantages of the invention can be achieved.

Although in the present embodiment, the duct body 6221 of the second air outlet duct 622 is composed of a substantially cuboid hollow member, other shapes can also be adopted thereto providing a vertical wall substantially perpendicular to the discharge direction of the axial fan 621 is provided, and the shape can lead the air discharged from the axial fan 621 to the air outlet 233 after turning the air flow by the vertical wall at an angle substantially 90 degrees towards a side receding from the projection direction of the projector lens 3.

Although in the embodiment, the louver 234 is formed integrally with the front case 23, a structure in which the louver 234 is eliminated, and the second air outlet duct has a shape extending towards the air outlet 233 so that the second air outlet duct and the air outlet 233 can be directly connected, for example, can also be adopted.

Although in the embodiment, the second air outlet duct 622 is configured to have the distance between the side end face 6221A and the vertical wall 6221C substantially equal to the vertical size or the horizontal size of the square in the plan view in the side end face 6221A, this is not the limitation. The distance between the side end face 6221A and the vertical wall 6221C greater than a half the vertical size or the horizontal size of the square in the plan view in the side end face 6221A is sufficient.

Although in the embodiment, the projector 1 using three liquid crystal panels 441 is explained, this is not the limitation. For example, it can be applied to a projector using only one liquid crystal panel, a projector using two liquid crystal panels, or a projector using four or more of liquid crystal panels. Further, although the transmissive type is used as the liquid crystal panel 441, this is not the limitation. The reflective liquid crystal panels can be adopted, or the digital micromirror device (trademark of the Texas Instruments) can also be adopted. In the case the digital micromirror device is adopted, the entrance polarization plate 442A and the exit polarization plate 442B can be eliminated.

Although in the embodiment, the optical unit 4 has a substantially L-shape in the plan view, other shapes such as a substantially U-shape in the plan view can also be adopted.

Although in the embodiment, the transmissive optical modulation device having the entrance surface and the exit surface separately is used, the reflective optical modulation device having a common surface used as both the entrance surface and the exit surface can also be used.

Although in the embodiment, only an example of the front type of projector for performing projection from the direction in which the screen is observed is explained, the invention can be applied to rear projectors for performing projection from the direction opposite to the direction in which the screen is observed.

Although the most preferable configuration for putting the invention into practice and so on are disclosed in the above descriptions, the invention is not limited thereto. Namely, although the invention is particularly illustrated and described with respect mainly to a specific embodiment, those skilled in the art can apply various modifications to the embodiment described above in detailed configurations such as shapes, materials, quantity, and so on within the scope, the spirit, the technical concepts, or the object of the invention.

Accordingly, the descriptions limiting the shapes, the materials, and so on are provided as exemplification only for easier understanding of the invention, but not for limiting the invention. Therefore, descriptions with the names of the elements with a part or all of the limitations such as a shape or a material removed therefrom are included in the invention.

The projector according to the invention is capable of assuring silentness, blocking the leakage light to the outside of the exterior chassis without making the shape of the ventilation duct more complicated, and preventing the fluctuation on the projected image caused by the exhaust stream, and accordingly is advantageous as the projector used for presentations or home theater.

The entire disclosure of Japanese Patent Application No. 2005-245130, filed Aug. 26, 2005 is expressly incorporated by reference herein.

What is claimed is:

1. A projector comprising:
   an image projection device including, a light source device, a optical modulation device that modulates a light beam emitted from the light source device in accordance with image information, and an projection optical device that projects enlarged projection of the light beam modulated by the optical modulation device disposed in a substantially L-shape sequentially from one end to the other end;
   an exterior chassis accommodating the image projection device, and provided with an air outlet for discharging inside air to the outside formed on an end face on the side of direction of projection; and
   a ventilation device configured to block leakage light and to insulate sound of the projector and to discharge air inside the exterior chassis to the outside and includes an axial fan provided with a suction port for sucking air and a discharge port for discharging the sucked air, and disposed in an area inside the exterior chassis and surrounded by the substantially L-shape of the image projection device and adjacent to the light source device so that a discharging direction of air from the discharge port is set towards the projection optical device, and the suction port and the discharge port are set at a predetermined angle with a plane perpendicular to the direction of projection of the projection optical device, and an air outlet duct that is provided with a vertical wall substantially perpendicular to the discharging direction of the air from the discharge port of the axial fan to reflect leakage light and to insulate sound of the light source device internally, and bends the air discharged from the discharge port by the vertical wall at an angle of substantially ninety degrees towards a side receding from the projection optical device to lead to the air outlet of the exterior chassis.

2. The projector according to claim 1, further comprising a power supply device that supplies each of composing members of the projector with electricity, wherein the power supply device extends along the direction of projection of the projection optical device and is disposed at a side of the image projection device so that the power supply device and the light source device form a substantially L-shape, the axial fan is disposed so as to form a substantially triangle space in a plan view in conjunction with the light source device, and the power supply device.

3. The projector according to claim 1, wherein the exterior chassis is formed including an upper case forming a top face in the projector, a lower case forming a bottom face in the projector, and a front case forming a front face located in the direction of projection of the projection optical device in the projector, the front case is provided with the air outlet, and a tubular section is provided integrally with a periphery section of the air outlet and protrudes inward the exterior chassis at substantially the same angle as the predetermined angle of the axial fan with the plane perpendicular to the direction of projection of the projection optical device, so as to be connectable to the air outlet duct.

4. The projector according to claim 1, wherein the air outlet duct is formed including a substantially cuboid hollow member, an inlet for leading air inside is formed on one side end face of the substantially cuboid member, and an outlet for discharging inside air to the outside is formed on a side end face intersecting with the one side end face, the one side end face has a substantially square shape in a plan view, and the air outlet duct is arranged to have a distance between the one side end face and the vertical wall, which is the side end face opposing the one side end face, greater than a half a vertical size or a horizontal size of the substantially square shape in a plan view of the one side end face.

* * * * *

UNITED STATES PATENT AND TRADEMARK OFFICE
CERTIFICATE OF CORRECTION

PATENT NO. : 7,631,973 B2  Page 1 of 1
APPLICATION NO. : 11/500643
DATED : December 15, 2009
INVENTOR(S) : Matsumiya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this

Second Day of November, 2010

David J. Kappos
*Director of the United States Patent and Trademark Office*